United States Patent [19]
Hochfield et al.

[11] Patent Number: 5,134,648
[45] Date of Patent: Jul. 28, 1992

[54] RECONFIGURABLE MODEM FOR A COMPUTER OR THE LIKE

[75] Inventors: Barry Hochfield, Noisy le Roi; Nicolas Bocquet, Paris, both of France

[73] Assignee: Apple Computer, Inc., Cupertino, Calif.

[21] Appl. No.: 582,526

[22] Filed: Sep. 14, 1990

[30] Foreign Application Priority Data

Sep. 15, 1989 [FR] France .................. 89 12112

[51] Int. Cl.⁵ .......................................... H04M 11/00
[52] U.S. Cl. ........................................ 379/98; 379/441; 379/93
[58] Field of Search ............... 379/90, 91, 93-98, 379/441-443

[56] References Cited

U.S. PATENT DOCUMENTS

4,841,561 6/1989 Hill .................................. 379/97
4,868,863 9/1989 Hartley et al. .................. 379/98

FOREIGN PATENT DOCUMENTS

8703764 6/1987 World Int. Prop. O. .......... 379/441

*Primary Examiner*—James L. Dwyer
*Assistant Examiner*—Wing F. Chan

*Attorney, Agent, or Firm*—Blakely, Sokoloff, Taylor & Zafman

[57] ABSTRACT

A modem (200) for connecting a computer (100) or the like to a telephone network for data transmission purposes, the modem being of the type including a modulation/demodulation circuit for converting the digital signals of the computer into analog signals capable of being conveyed by the telephone network and vice versa, a computer interface circuit, and a telephone line interface circuit specially designed for a telephone network of a given type. The modem is characterized in that it comprises: a main circuit (210) designed to be placed inside the computer box (102) and incorporating the modulation/demodulation circuit (214) and the computer interface circuit (216); an auxiliary circuit (220) situated in a box (225) external to the computer box and incorporating the telephone line interface circuit; and disconnectable connection means (Cl, 230, 232) between the auxiliary circuit and the main circuit. The modem further includes means for at least periodically transferring an identification code from the auxiliary circuit to the main circuit, the identification code being stored in said auxiliary circuit and being representative of said given type of telephone network, means being provided in the main circuit for adapting the operating characteristics of said main circuit to said given type of network.

11 Claims, 2 Drawing Sheets

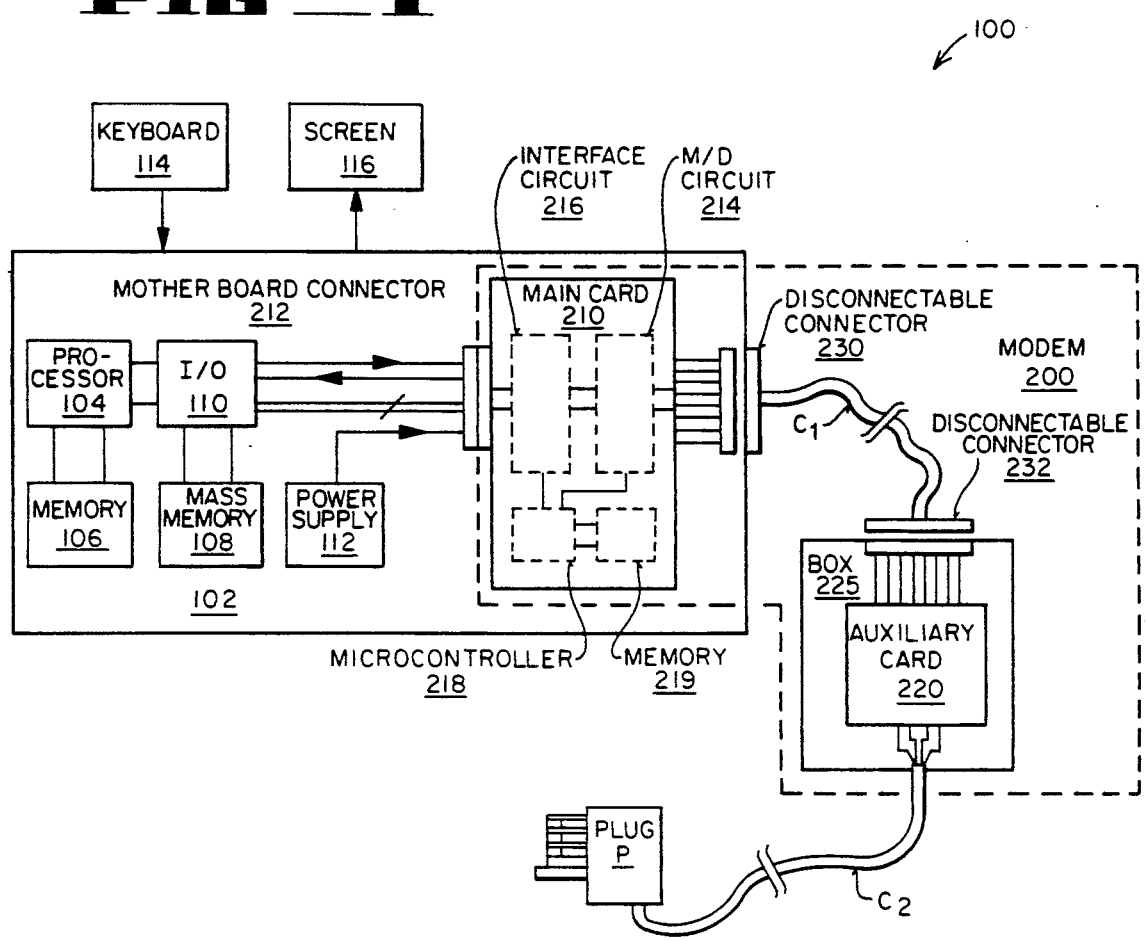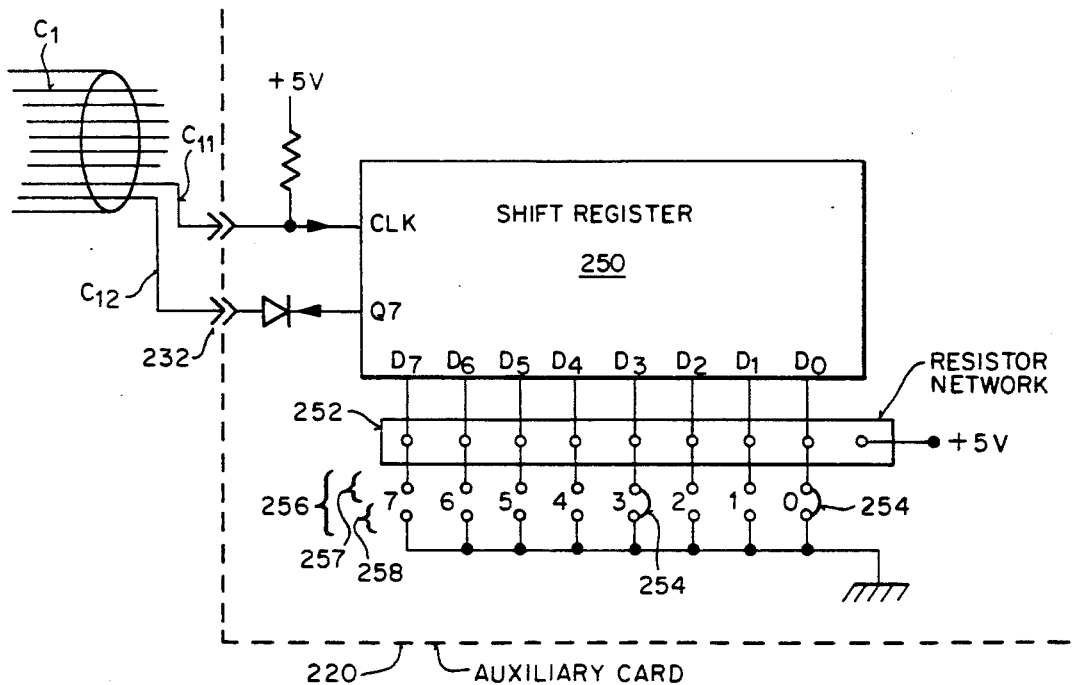

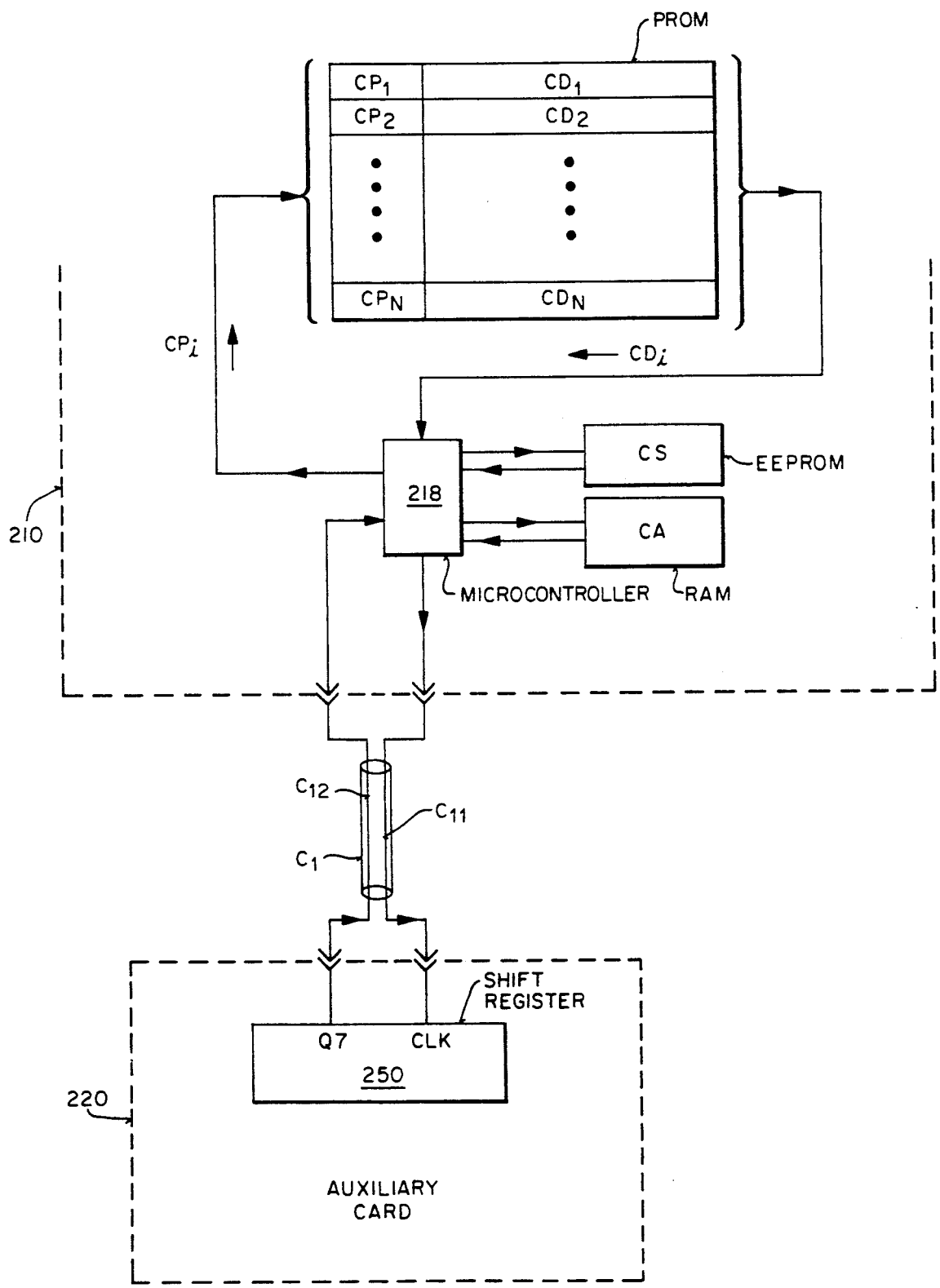
FIG_3

RECONFIGURABLE MODEM FOR A COMPUTER OR THE LIKE

FIELD OF THE INVENTION

The present invention relates to modems (modulator/demodulators) for transmitting digital data between computers or the like in the form of analog signals transitting via a telephone network. The invention relates more particularly to a novel modem organization facilitating adapting modem operation to the standards and regulations laid down in different countries.

BACKGROUND OF THE INVENTION

A modem is conventionally in the form of a single electronic card which may be external to a computer, or which may be inserted inside a computer (an extension card). For an extension card, a mother board connector or the like establishes connections between the computer and the modem for power supply, control, and data interchange purposes, while a cord fitted with a telephone plug serves to establish a connection between the modem and a telephone line.

Portable and transportable computers are coming widespread these days. As a result, more and more computers are travelling with their users and are being used in different territories. At present, a given modem has specifications that are specific to a given country and it can operate properly or without risk of infringing regulations in that country only.

Thus, when a computer fitted with a first modem adapted to a first country arrives in another country and needs to be connected to the telephone network in that other country, the only solution available to the user consists in obtaining a second modem adapted to that other country, in opening up the computer, in removing the first modem, in installing the second modem in the place of the first, and in closing the computer.

These operations are inconvenient and they considerably reduce the time saving associated with having a portable computer. In addition, the need to have as many different modems available as countries visited is disadvantageous from the point of view of expense since a modem typically represents a non-negligible fraction of the total cost of the computer. Special precautions also need to be taken when transporting interchangeable modem cards, and the computer loses a part of its portable or transportable nature.

In addition, this operation replacing the modem card often requires the internal battery of a portable computer to be removed, and this has a consequence of losing any non-backed up data contained in its working memory (RAM).

The present invention seeks to mitigate these drawbacks of the prior art and to provide a modem capable of being installed in a computer without it being necessary to replace the entire modem each time the computer is to be connected to a telephone line in another country.

SUMMARY AND OBJECTS OF THE INVENTION

To this end, the present invention provides a modem for connecting a computer or the like to a telephone network for data transmission purposes. The modem is of the type including a modulation/demodulation circuit for converting the digital signals of the computer into analog signals capable of being conveyed by the telephone network and vice versa, a computer interface circuit, and a telephone line interface circuit specially designed for a telephone network of a given type. The modem is characterized in that it comprises a main circuit designed to be placed inside the computer box and incorporating the modulation/demodulation circuit and the computer interface circuit, and an auxiliary circuit situated in a box external to the computer box and incorporating the telephone line interface circuit, and disconnectable connection means between the auxiliary circuit and the main circuit. It further includes means for at least periodically transferring an identification code from the auxiliary circuit to the main circuit. The identification code is stored in said auxiliary circuit and is representative of said given type of telephone network. Means is provided in the main circuit for adapting the operating characteristics of said main circuit to said given type of network.

Preferred but non-limiting aspects of the modem of the invention include the following:

it comprises a single main circuit and a plurality of auxiliary circuits specially designed for a plurality of telephone networks of given types. A different identification code is stored in each auxiliary circuit. The main circuit is connected to a single auxiliary circuit at a time.

The main circuit is in the form of an extension card suitable for being mounted on an extension connecter of the computer.

Each identification code is a country code.

Each auxiliary circuit includes a shift register and means for applying selected logic levels to the parallel inputs of the shift register. The disconnectable connection means includes a first conductor for conveying a clock signal from the main circuit and applying it to the shift register, and a second conductor for conveying a serial signal from the secondary circuit to the main circuit. The serial signal is constituted by the selected logic levels in sequence as delivered by the shift register.

The main circuit includes a read only memory storing values at addresses corresponding to a plurality of identification codes. The valve serves to implement said adaptation of the operating characteristics of the main circuit.

The values include pointers for authorizing or for prohibiting the calling of specified subprograms in the main circuit.

The main circuit includes means for loading RAM with the values corresponding to the identification code stored in the auxiliary circuit connected at a given instant to the main circuit.

At least some of the values loaded into RAM are user-modifiable. A non-volatile memory is also provided for storing the values, optionally after modification, after the computer is switched off or reset.

The disconnectable connection means includes a multi-conductor cable having a disconnectable connector at least at its main circuit end.

BRIEF DESCRIPTION OF THE DRAWINGS

Other aspects, objects, and advantages of the present invention appear more clearly on reading the following detailed description of a preferred embodiment of the invention given by way of non-limiting example and made with reference to the accompanying drawings, in which:

FIG. 1 is a block diagram of a computer including a modem of the present invention;

FIG. 2 is a diagram showing a detail of the modem circuit of FIG. 1; and

FIG. 3 is a block diagram of a different portion of the modem of FIG. 1.

DETAILED DESCRIPTION

With reference to the drawings, and initially with reference to FIG. 1, a computer 100 includes a box 102 housing, in conventional manner, a processor circuit 104, memory circuits 106 (RAM and ROM), mass memory 108, input/output (I/O) circuits 110, a power supply 112, a keyboard 114, and a screen 116. The computer may be of the portable or the transportable type, e.g. of the laptop type with a fold-up screen.

The computer includes a modem (modulator/demodulator) given an overall reference 200 and enabling the computer to communicate over a telephone network with remote computers likewise fitted with modems.

In accordance with an essential aspect of the invention, the modem comprises a main circuit implemented on a main card 210 which is plugged into a mother board connector 212 inside the computer, and an auxiliary circuit implemented on an auxiliary card 220 and housed in a box 225 external to the computer.

The main card 210 includes the modulation and demodulation circuits per se 214 together with a circuit 216 for providing an interface with the computer. This card is preferably designed around a microcontroller 218 whose operation is controlled by a local program residing in a memory 219 such as a read only memory (ROM) or a battery-backed read/write memory (RAM).

On one side, the connector 212 is connected to the I/O ports 110 of the computer and to the power supply circuit 112, and on its other side the connector is connected to the circuits on the main modem card 210.

This connector may be an eighteen way connector, conveying (i) the various power supply voltages required, together with ground, (ii) send and receive digital data, and (iii) various monitoring and control signals.

The auxiliary modem card 220 includes an interface circuit for an analog telephone line. It is connected to the main card by an eight-conductor cable C1 conveying voltages and signals which are described below. The cable C1 is connected to the main card 210 by an easily disconnected connector 230 and to the auxiliary card either by means of a connector 232, as shown, or else directly by soldering its conductors to the card. The auxiliary card is also connectable to a telephone network by means of a conventional two- or four-conductor cable C2 with the number of conductors depending on the country (there being four conductors in the present example), with the end of the cable C2 being fitted with a plug P for connection to the telephone network.

The hardward and software of the above-described modem are not described in detail herein. Overall (i.e. taking the card 210 and 220 as constituting portions of the same circuit) the modem is conventional in design, and it differs from prior modems essentially by its modular nature. For further details concerning the electrical hardware of such a modem, reference may be made to current technical works.

The preferred features of such a modem are merely indicated very briefly below:

provision for both manual and automatic dialing;

provision for both manual and automatic answering;

data rates at 2400, 1200, 300, 100, or 75 bits per second over the communications channel, in accordance with the following specifications; Bell 103 and 213A, and CCITT V21, V22, V22bis and V23;

data rates of 9600, 4800, 2400, 1200, 300, or 110 bits per second between the modem and the host computer, operating asynchronously in "control" mode;

data rates of 9600 and 4800 bits per second in on-line mode when using an optical data compression and error correction card;

asynchronous mode communication between the modem and the host computer;

automatic recall of the previous configuration when switched on;

software selection between Bell 212A/103, OCITT V22/V21, or CCITT V23 modes, each time with or without data compression and error correction;

a range of data formats:

7 data bits, 1 parity bit, and 1 or 2 stop bits;

7 data bits, no parity, 2 stop bits; or 8 data bits, no parity, 1 or 2 stop bits;

standardized AT command set;

a subset of the standardized V25 command set should that be required by the regulations applicable in at least one country;

automatic adaptive equalization on the receive channels;

pulse dialing or voice frequency dialing;

full detection of all stages of a call: busy, dial tone, remote ringing tone, second dial tone;

ringing current detection;

various tests, diagnostics, and acoustic checks;

for countries where required or allowed, integrated automatic calling features, with handling of "black lists"; and the possibility of adding a specialized error correction and data compression card, which is likewise conventional.

The signals conveyed by the cable C1 between the main card and the auxiliary card of the modem may be the following:

+5 V power supply for the auxiliary card;

ground;

analog line for send and receive signals;

ringing indicator (from the auxiliay card to the main card);

two lines for controlling relays on the auxiliary card; and two special lines (conductors C11 and C12) whose function is described below.

Naturally, the allocation of functions to the conductors as listed above may vary widely.

As mentioned in the introduction, the specifications for communication over telephone lines may vary widely from one country to another. The differences are either physical or electrical or else they are to do with timing.

In accordance with the present invention, various different types of auxiliary line interface card are provided, with each auxiliary card being designed specifically as a function of the regulations imposed by the telecommunications authority in a given country or group of countries with respect to the physical specifications for modems.

In contrast, the main card of the modem is common to all the auxiliary cards and may be permanently incorporated in the computer. It is designed to be capable of adapting to the regulations specific to each country. To this end, it includes configurable software for implementing all of the basic functions required or authorized in each of the intended countries, in particular with respect to the timing of the various operations (making a call, answering, dialing, etc. . . . ).

Thus, the main card 210 is capable of operating with a selected one of a plurality of auxiliary cards as chosen by the user as a function of the countries in which the computer is to be used for communicating with other computers, and it is capable of configuring itself automatically from the software point of view as a function of the specifications of the country in question.

In order to achieve the above objects, each different type of auxiliary card includes, in accordance with the invention, a specific identification code permanently stored therein and representative of the country for which the said auxiliary card is designed. At the same time, the main card is designed to interrogate the auxiliary card connected thereto at a given instant so that the auxiliary card returns its own identification code to the main card, thereby enabling the main card to configure its software as a function of said code. Further, as described below, this interrogation of the auxiliary card is designed to prevent any misuse of an unsuitable auxiliary card, by reading the country code of said auxiliary card prior to seizing the line under any circumstances (making a call or answering one).

FIG. 2 shows a preferred circuit for implementing this function of interrogating the auxiliary card and returning the country code to the main card.

A shift register 250 (e.g. an 8-bit shift register) is provided in the auxiliary circuit and has 8 individual parallel inputs referenced D7 to D0 which are connected to the +5 V terminal via respective resistors implemented in this case in the form of a resistor network diagrammatically represented by block 252. These eight inputs are also capable of being selectively connected to ground by jumpers or the like 254 connected between pairs of respective terminals 257, 258 on a terminal strip 256.

The country code is determined by placing jumpers between appropriate pairs of terminals. In the example shown, jumpers are installed on the terminals numbered 3 and 0 (with these numbers representing respective binary weights), such that the 8-bit word input to the shift register 250 is 11110110, i.e. F6 in hexadecimal notation.

The clock input CLK of the circuit 250 is connected to the main circuit of the model via one of the conductors C11 of the cable C1, and the serial output Q7 of the circuit 250 is connected to said main circuit 210 by another conductor, referenced C12.

When the main circuit desires to interrogate the connected auxiliary circuit in order to discover its country code, it applies a stream of clock pulses to the conductor C11 by means of an appropriate circuit (not shown). These pulses cause the eight data inputs to the serializing shift register 250 to be output sequentially over the conductor C12 leading to the main circuit, which circuit includes means (not shown) for storing the country code.

With reference to FIG. 3, the main circuit of the modem includes a table in an appropriate programmed read only memory (PROM), which table associates a set of predetermined default values with each country code CPI, thereby enabling the microcontroller 218 to configure the said main circuit as a function of each of the countries. These values are referenced CDI and referred to as default configuration values.

For example, these values may comprise communications parameters (user-selectable or otherwise), addresses of authorized or prohibited routines in the communications software governing the operation of the modem, or pointers to prohibited or authorized modes of modem operation, etc. . . . .

Some of the parameters that may be included in an active configuration are listed below:

number of rings prior to tripping automatic call answering;

waiting time between seizing a line and beginning to dial;

time to wait for dial tone before releasing the line;

pause time;

carrier detection time delay;

carrier loss time delay;

duration of voice frequency dialing signals;

mark-space ratio and frequency of dial pulses; etc.

In addition, the main card of the modem includes RAM for storing the active configuration CA that governs the operation of the modem at a given instant, and also a non-volatile memory such as an electrically erasable programmable read only memory (EEPROM) referred to as the configuration back-up memory, referenced as CS and capable of storing a backed-up configuration in a manner described below.

The various operating modes of the modem with respect to configuration for a particular country are described below with reference to some of the modem commands.

When the modem software is reset (standardized command ATZ2), the main circuit 210 consults the country code of the connected auxiliary circuit in the manner described above, and the default configuration associated in the ROM with the country code obtained is loaded firstly into the active configuration RAM and secondly into the configuration back-up EEPROM. The user may then modify such parameters in the active configuration CA as are available for user modification. Such modifications affect the contents of the configuration back-up memory only when the modem is next put on standby (its microprocessor is stopped). The modem is then fully configured and data transmission may be performed. Variants of this command may consist in loading the configuration RAM from the back-up configuration rather than from the default configuration, in particular each time the computer is switched on. Under such circumstances, the country code of the auxiliary card is still consulted and the modem verifies that the backed-up configuration ready to become the active configuration does indeed correspond to the country code obtained. This prevents any possibility of misuse of an auxiliary card that does not correspond to the country of utilization.

When performing a special instruction for recalling a default configuration (command AT&F or ATZ2), the country code of the auxiliary card is consulted again, and the default configuration that corresponds to the country code in the table is then loaded into the active configuration memory.

When a special command is issued requesting the country code (command AT13), for the purpose merely of identifying the product, the country code stored in the auxiliary card is consulted. No action is undertaken in this case concerning the active configuration or the configuration by default.

During a dialing command (command ATDs), the country code is consulted again, thereby enabling the modem to look up the appropriate values of parameters concerning the procedure for making a call and dialing it in the block of values corresponding to the country code obtained.

Finally, each time the active configuration is backed up in the back-up memory or each time the backed-up configuration is called for loading into the active configuration RAM, the country code is consulted again in order verify that the configuration is in compliance with the country code obtained.

It is mentioned here that when some of the parameters of a default configuration are available for user modification, then the user is allowed to modify them only after the default configuration has been loaded into the active configuration memory.

In a variant, two distinct configurations may be saved in non-volatile memory, thereby making it very easy for a user to recall that one of the two configurations which the user uses most often, for example.

Means may also be provided in the modem software for emitting a sound signal or some other form of signalling when the country code that has just been read and stored differs from the country code that was stored at the preceding interrogation, i.e. whenever an auxiliary box containing an auxiliary card specific to a given country is replaced by another auxiliary box containing the card specific to another country. To this end, comparator means may be provided to compare the current country code with the new country code, which means may be implemented, for example, in the form of an appropriate subprogram in the program governing the microcontroller 218.

Another variant may consist in providing a special configuration when no auxiliary modem box is connected to the computer, for whatever reason. This special configuration is also stored in the PROM, in association with a special code corresponding to the absence of any auxiliary box.

Finally, although the above description relates to external boxes containing auxiliary circuits adapted to the electrical requirements of telephone lines, it is also possible to design auxiliary circuits enabling the modem to be connected to radio systems and to acoustic couplers.

Operation of a modem as described above is completely transparent for the user. The user merely has to connect the computer to the external box containing the appropriate auxiliary circuit for the telephone network of the country in which the computer is being used, and to replace this box with another each time the user changes country.

Whenever configuration operations are necessary, they are performed automatically by the modem's microcontroller without requiring any action by the user other than modifying or adjusting such parameters as are made available to the user, i.e. configuration takes place in the same manner as for a conventional one-piece modem.

It will be understood from the above that the auxiliary card constitutes a small fraction of the total cost of the modem, and that the invention thus makes it possible to use the same modem in numerous countries with the extra costs being minimized.

Naturally, the present invention is not limited in any way to the embodiment described above and shown in the drawings, and the person skilled in the art will readily be able to make variations or modifications within the scope of the invention.

In particular, although the above description relates to an auxiliary circuit contained in a self-contained box connected to the computer via cable, it would naturally be possible for this box to be in the form of a cartridge or the like suitable for being removably received on a dedicated connector provided on one of the side or rear faces of the computer, for example.

In addition, the jumpers 254 for encoding the country code in the auxiliary circuit could be replaced by any other equivalent device, and in particular by a set of microswitches inside the box.

What is claimed is:

1. A MODEM for connecting a computer to a given type telephone network for data transmission, comprising:

a main circuit connected to the computer and placed inside the computer, wherein the main circuit includes:
 (i) a computer interface circuit coupled to the computer, and
 (ii) a modulation/demodulation circuit coupled to the computer interface circuit for converting digital signals from the computer into analog signals capable of being conveyed by the given type telephone network and converting analog signals from the given type telephone network into digital signal capable of being received by the computer;

an auxiliary circuit situated in a box external to the computer and connected to the given type telephone network, wherein the auxiliary circuit includes a telephone line interface circuit coupled to the given type telephone network, the telephone line interface circuit being specially designed for the given type telephone network; and a disconnectable connection means connected between the main circuit and the auxiliary circuit, wherein the disconnectable connection means includes a multi-conductor cable with at least one disconnectable connector;

wherein the auxiliary circuit further includes:
 (1) a shift register means with a set of parallel input terminals and connected to the disconnectable connection means for storing and sequentially outputting a first identification code through the disconnectable connection means to the main circuit, the first identification code being representative of the given type telephone network; and
 (2) circuit means connected to the input terminals of the shift register means for generating the first identification code to the shift register means;

wherein the disconnectable connection means further includes:
 (3) a first conductor for conveying a clock signal from the main circuit to the shift register means; and
 (4) a second conductor for conveying serially the first identification code from the shift register means to the main circuit;

wherein the main circuit further includes:
 (5) a first memory for storing, at addresses, a plurality of identification codes, each with its values corresponding to operating characteristics of one type of telephone network, the plurality of identification codes in the first memory including the first identification code and the values corresponding to the operating characteristics of the given type telephone network;

(6) a second memory for storing the values corresponding to the operating characteristics of the given type telephone network; and (7) a microprocessor coupled to the first conductor and the second conductor of the disconnectable connection means for conveying the clock signal to the shift register means and receiving the first identification code from the shift register means, the microprocessor being coupled to the first memory and the second memory for addressing the first memory with the first identification code for the values corresponding to the operating characteristics of the given telephone network and loading the second memory with the values corresponding to the operating characteristics of the given type telephone network such that the MODEM adapts the operating characteristics of the given type telephone network when the second memory is loaded with the values corresponding to the operating characteristics of the given type telephone network, the microprocessor being also connected to control the operation of the modulation/demodulation circuit and the computer interface circuit with the values corresponding to the operating characteristics of the given type of telephone network stored in the second memory.

2. The MODEM of claim 1, wherein the first memory including a programmable read only memory.

3. The MODEM of claim 1, wherein the second memory including a random access memory, the values stored in second memory being modifiable.

4. The MODEM of claim 1, further comprising in the main circuit a non-volatile memory for storing the values, optionally after modification, after the computer is switched off or is reset.

5. The MODEM of claim 1, wherein the first conductor and the second conductor are also provided with other transmitting signals so as to reduce the number of conductors.

6. The MODEM of claim 1, wherein the values including pointers for authorizing or prohibiting the calling of specified sub-programs in the first memory.

7. The MODEM of claim 6, further comprising a comparator means in the main circuit for comparing said first identification code currently loaded from said shift register means with said first identification code stored in said non-volatile memory, said comparator means emitting a sound signal or other form of signaling when the comparison results in a mis-match.

8. The MODEM of claim 7, wherein said comparator means is a program running on said microprocessor.

9. A MODEM for connecting a computer to a given type telephone network for data transmission, comprising:

a main circuit connected to the computer and placed inside the computer, wherein the main circuit includes:
(i) a computer interface circuit coupled to the computer, and
(ii) a modulation/demodulation circuit coupled to the computer interface circuit for converting digital signals from the computer into analog signals capable of being conveyed by the given type telephone network and converting analog signals from the given type telephone network into digital signal capable of being received by the computer;

an auxiliary circuit situated in a box external to the computer and connected to the given type telephone network, wherein the auxiliary circuit includes a telephone line interface circuit coupled to the given type telephone network, the telephone line interface circuit being specially designed for the given type telephone network; and a disconnectable connection means connected between the main circuit and the auxiliary circuit, wherein the disconnectable connection means includes a multi-conductor cable with at least one disconnectable connector;

wherein the auxiliary circuit further includes:
(1) a storage means with a set of parallel input terminals and connected to the disconnectable connection means for storing and sequentially outputting a first identification code through the disconnectable connection means to the main circuit, the first identification code being representative of the given type telephone network; and
(2) circuit means connected to the input terminals of the storage means for generating the first identification code to the storage means;

wherein the disconnectable connection means further includes:
(3) a first conductor for conveying a clock signal from the main circuit to the storage means; and
(4) a second conductor for conveying serially the first identification code from the storage means to the main circuit;

wherein the main circuit further includes:
(5) a first memory for storing, at addresses, a plurality of identification codes, each with its values corresponding to operating characteristics of one type of telephone network, the plurality of identification codes in the first memory including the first identification code and the values corresponding to the operating characteristics of the given type telephone network;
(6) a second memory for storing the values corresponding to the operating characteristics of the given type telephone network, wherein the values in the second memory are user-modifiable;
(7) a backup storage means for storing the values corresponding to the operating characteristics of the given type telephone network stored in the second memory, optionally after modification, after the computer is switched off or reset;
(8) a microprocessor coupled to the first conductor and the second conductor of the disconnectable connection means for conveying the clock signal to the storage means and receiving the first identification code from the storage means, said microprocessor being coupled to the first memory and the second memory and the backup storage means, wherein the microprocessor addresses the first memory with the first identification code for the values corresponding to the operating characteristics of the given type telephone network and loads the values corresponding to the operating characteristics of the given type telephone network first into the second memory and secondly into the backup storage means such that the MODEM adapts the operating characteristics of the given type telephone network when the second memory is loaded with the values corresponding to the operating characteristics of the given type telephone network, wherein the microprocessor updates the backup storage means with the values stored in the second memory after modification when the microprocessor is next switched off or reset, wherein the microprocessor then loads the values stored in the backup storage means back into the second memory each time the computer is switched on, wherein the microprocessor is also connected to control the operation of the modulation/demodulation circuit and the computer interface circuit with the values stored in the second memory; and (9) program means operable on the microprocessor for comparing the first identification code currently loaded from the storage means with the first identification code stored in the second memory from the backup storage means and program means emitting a sound signal or other form of signalling when the comparison reveals a mis-match.

10. The MODEM of claim 9, wherein the first conductor and the second conductor are also provided with other transmitting signals so as to reduce the number of conductors.

11. The MODEM of claim 9, wherein the values including pointers for authorizing or prohibiting the calling of specific subprograms in the first memory.

* * * * *